United States Patent
Eto et al.

(10) Patent No.: US 8,593,712 B2
(45) Date of Patent: Nov. 26, 2013

(54) SMALL SIZE FAST STEERING MIRROR HAVING SMALL SIZE AND EXCELLENT VIBRATION CHARACTERISTICS

(75) Inventors: Daisuke Eto, Tokyo (JP); Kazuhiko Aoki, Tokyo (JP); Hisaya Niizawa, Tokyo (JP)

(73) Assignees: NEC Corporation, Tokyo (JP); NEC Toshiba Space Systems, Ltd., Tokyo (JP)

( * ) Notice: Subject to any disclaimer, the term of this patent is extended or adjusted under 35 U.S.C. 154(b) by 135 days.

(21) Appl. No.: 13/384,128

(22) PCT Filed: Jun. 1, 2010

(86) PCT No.: PCT/JP2010/059580
§ 371 (c)(1),
(2), (4) Date: Jan. 13, 2012

(87) PCT Pub. No.: WO2011/007628
PCT Pub. Date: Jan. 20, 2011

(65) Prior Publication Data
US 2012/0127551 A1 May 24, 2012

(30) Foreign Application Priority Data
Jul. 17, 2009 (JP) .................................. 2009-168844
Mar. 30, 2010 (JP) .................................. 2010-076888

(51) Int. Cl.
*G02B 26/08* (2006.01)
(52) U.S. Cl.
USPC ....................................................... 359/224.1

(58) Field of Classification Search
USPC ........ 359/199.3, 223.1–226.1, 290, 291, 871, 359/872
See application file for complete search history.

(56) References Cited

U.S. PATENT DOCUMENTS

| 5,280,377 A | 1/1994 | Chandler et al. |
| 6,445,488 B1 * | 9/2002 | Lee .............................. 359/224.1 |
| 6,879,747 B2 | 4/2005 | Ikegame |

FOREIGN PATENT DOCUMENTS

| JP | 03-260924 A | 11/1991 |
| JP | 05-264917 A | 10/1993 |
| JP | 11-281925 A | 10/1999 |
| JP | 2001-033713 A | 2/2001 |
| JP | 2001-264663 A | 9/2001 |
| JP | 2002-156591 A | 5/2002 |

* cited by examiner

*Primary Examiner* — Euncha Cherry
(74) *Attorney, Agent, or Firm* — Sughrue Mion, PLLC

(57) ABSTRACT

A fast steering mirror has n plate springs (40a to 40d) and m drive means (50a to 50d). The plate springs (40a to 40d) are arranged such that a cross-sectional plane passing through the center of the thickness of each of the plate springs is on the same plane as the reflection surface of a mirror (20), and are arranged rotationally symmetric to each other about the center (O20). The plate springs each have a section extending along the circumference of the mirror holder, the section being obtained by dividing the perimeter of the mirror holder substantially into n sections. The drive means (50a to 50d) are arranged such that a cross-sectional plane passing through the center of torque generated by each of the drive means is on the same plane as the reflection surface of the mirror (20) and are rotationally symmetric to each other about the center (O20).

18 Claims, 14 Drawing Sheets

SMALL SIZE FAST STEERING MIRROR HAVING SMALL SIZE AND EXCELLENT VIBRATION CHARACTERISTICS

CROSS REFERENCE TO RELATED APPLICATION

This application is a National Stage of International Application No. PCT/JP2010/059580 filed Jun. 1, 2010, claiming priority based on Japanese Patent Application No. 2009-168844, filed Jul. 17, 2009, and Japanese Patent Application No. 2010-076888, filed Mar. 30, 2010, the contents of all of which are incorporated herein by reference in their entirety.

TECHNICAL FIELD

This invention relates to a fast steering mirror (FSM) having a mirror and a mirror tilt actuator which mounted thereon the mirror and controls the direction of a reflection beam (reflection direction and traveling direction) reflected from the mirror.

BACKGROUND ART

Intersatellite optical communication is expected as an effective bulk communication system in outer space. Since very little light is scattered or absorbed in outer space, outer space is an extremely good light transmission path, which can transmit light for a distance as long as several tens thousands km without the need of amplification.

In order to establish such intersatellite optical communication successfully, optical communication antennas must be set on both of the transmitting and receiving sides to precisely oppose each other with an extremely small limit of error on the order of $1/10,000$ degrees. In order to switch a satellite to be communicated with, it is necessary to rapidly track and acquire a target antenna. This means that an optical communication antenna is required to combine high-precision tracking capability and high-speed acquisition capability. In general, a beam pointing system for intersatellite optical communication is composed of two mechanisms of a coarse pointing mechanism (CPM) for roughly controlling the beam direction and a fine pointing mechanism (FPM) for precisely controlling the beam direction on the order of $1/10,000$ degrees. Specifically, the CPM is often provided with a large-size gimbal mirror, whereas the FPM is often provided with a small size fast steering mirror. This invention relates to a small size fast steering mirror suitably applicable to the latter, namely the FPM.

This type of beam pointing system is disclosed, for example, in Japanese Laid-Open Patent Publication No. JP-A-2001-264663 (Patent Document 1) and Japanese Laid-Open Patent Publication No. JP-A-H11-281925 (Patent Document 2).

Referring to FIG. 1, a mirror drive mechanism disclosed in Patent Document 1 is of a biaxial gimbal type, and a movable part 249 including a mirror 250 is fixed to a base by means of deformable elastic pivots 246a-246b and 248a-248b. The mirror 250 is tilted about the X-axis and the Y-axis as viewed in the figure by electromagnetic power exerted by a drive unit composed of yokes 245a-245b and 254a-254b, permanent magnets 251a-251b and 252a-252b, and coils 255a-255b and 256a-256b.

Referring to FIG. 2 and FIG. 3, a laser pointing device 600 disclosed in Patent Document 2 is shown. A mirror holder 602 including a mirror 601 is fixed to a base 605 by means of a torsion bar 603 extending in a Z-axis direction from the center of the mirror holder 602, and a leaf spring 604 which is bent from the XY plane of the mirror holder 602 toward a Z-axis direction. The mirror holder 602 has arms 606 extended therefrom, and there are provided at the ends of the arms, drive units composed of coils 607a to 607d and permanent magnets 608a to 608d, respectively. The mirror holder 602 is tilted by the electromagnetic force of the drive units, toward a θx direction or θy direction around the fixed end of the torsion bar 603. The torsion bar 603 and the leaf spring 604 suppress the shift of the mirror holder 602 in a Z-axis direction.

In the mirror drive mechanism described in Patent Document 1, stress is concentrated at the elastic pivots 246a-246b and 248a-248b during tilt driving. In the laser pointing device 600 described in Patent Document 2 as well, stress is concentrated at the base portion of the of the torsion bar 603. In order to ensure resistance to such stress, the rigidity of the elastic pivots 246a-246b and 248a-248b or the torsion bar 103 must be enhanced to realize a robust structure, which results in reduced efficiency in tilt drive.

Further, since the mirror drive mechanism described in Patent Document 1 is of a biaxial gimbal structure, the size of the mirror face is large. In the laser pointing device 600 of Patent Document 2 as well, the size of the mirror face is so large due to the arms 606 extending from the mirror holder 602 that the laser pointing device 600 cannot be suitably mounted in a limited space such as in a satellite.

Still further, this kind of beam pointing system is required to have superior vibration characteristics.

DISCLOSURE OF THE INVENTION

Therefore, an object of this invention is to provide a fast steering mirror which is able to realize both of alleviated stress concentration and high tilt drive efficiency, is yet compact in size, and exhibits superior vibration characteristics.

This invention provides a fast steering mirror comprising: a mirror; a base; a mirror holder for holding the mirror; an elastic member for supporting the mirror holder movably relative to the base; and drive means for directing a reflected beam from the mirror to a desired direction by driving the mirror holder in response to a control signal to adjust the tilt angle of the mirror. The fast steering mirror has n plate springs as the elastic member, and m drive means as the drive means, (n and m are integers of 2 or more when the tilt actuator is a uniaxial actuator, and are integers of 3 or more when the tilt actuator is a biaxial actuator). The n plate springs are arranged such that their surfaces are parallel to the reflection surface of the mirror and such that the plate springs are rotationally symmetric to each other about the center of the reflection surface of the mirror, and the n plate springs each have a section extending along the circumference of the mirror holder, the section being obtained by dividing the perimeter of the mirror holder substantially into n sections. The m drive means have cross-sections passing through the centers of the torque generated by the respective drive means (virtual planes) which are on the same plane as the reflection surface of the mirror, and are arranged to be rotationally symmetric to each other about the center of the reflection surface of the mirror.

This invention also provides an optical communication antenna having the fast steering mirror as described above.

This invention also provides an intersatellite optical communication system having the optical communication antenna described above.

BEST MODE FOR CARRYING OUT THE INVENTION

A fast steering mirror according to this invention has a mirror, a base, a mirror holder for holding the mirror, elastic members for supporting the mirror holder movably relative to the base, and drive means for driving the mirror holder in response to a control signal to adjust the tilt angle of the mirror so as to direct a beam reflected by the mirror in a desired direction.

Particularly, the fast steering mirror according to the invention has n plate springs as the elastic members, and m drive means as the drive means (n and m are integers of 2 or more when the actuator is a uniaxial actuator, and integers of 3 or more when the actuator is a biaxial actuator).

The n plate springs are arranged such that their surfaces are parallel to the reflection surface of the mirror and are rotationally symmetric to each other about the center of the reflection surface of the mirror, and they each have at least a section extending along the circumference of the mirror holder, the section being obtained by dividing the perimeter of the mirror holder substantially into n sections.

Each of the m drive means has a cross-section (virtual plane) passing through the center of torque generated thereby that is situated on the same as plane as the reflection surface of the mirror. Further, the m drive means are arranged to be rotationally symmetric about the center of the reflection surface of the mirror.

This fast steering mirror, having the aforementioned configuration, exhibits excellent tilt drive efficiency and vibration characteristics since the plate springs are long enough about the mirror holder to alleviate the concentration of stress, and the reflection surface of the mirror will not be displaced unnecessarily in a thickness direction (Z-axis direction) of the mirror. Furthermore, the fast steering mirror is compact in size since the plate springs are basically arranged about the outer periphery of the mirror holder.

Exemplary preferred embodiments of the fast steering mirror according to this invention will be described with reference to the drawings.

First Embodiment

Figure 1:
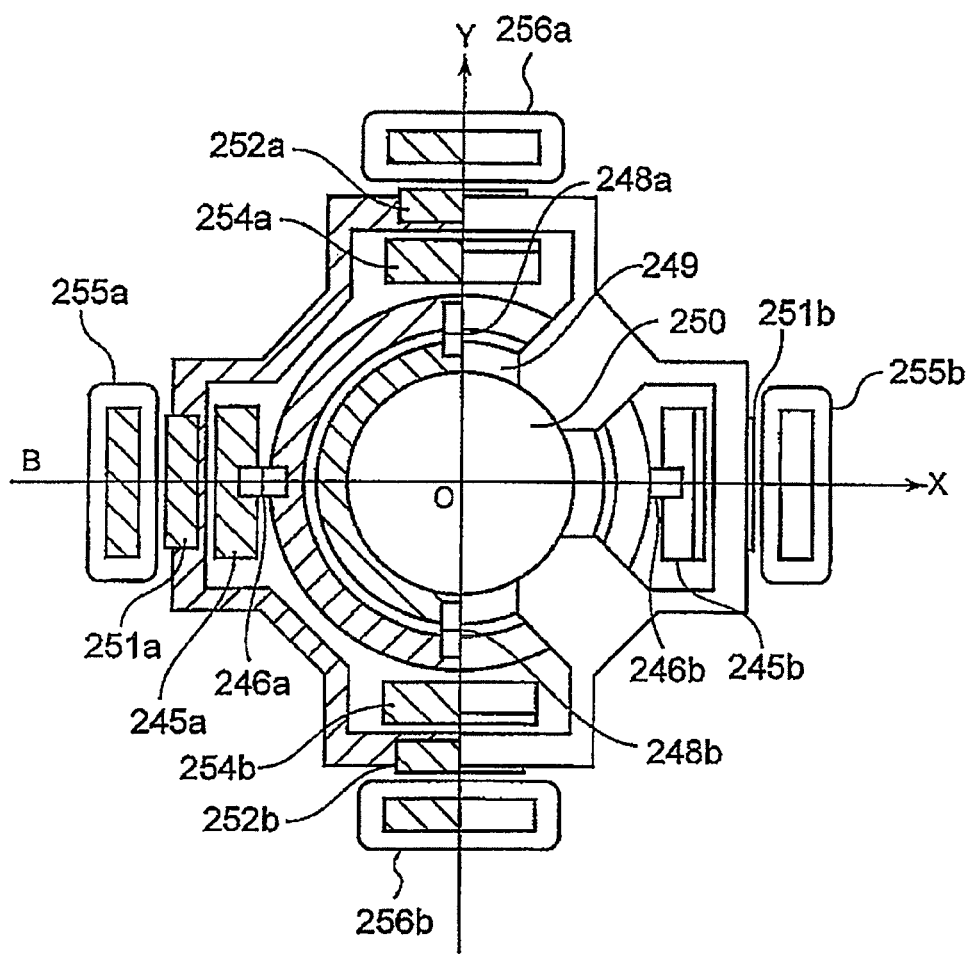
FIG. 1 is a diagram illustrating a mirror drive mechanism which is a beam pointing system according to a related art of this invention.
Figure 2:
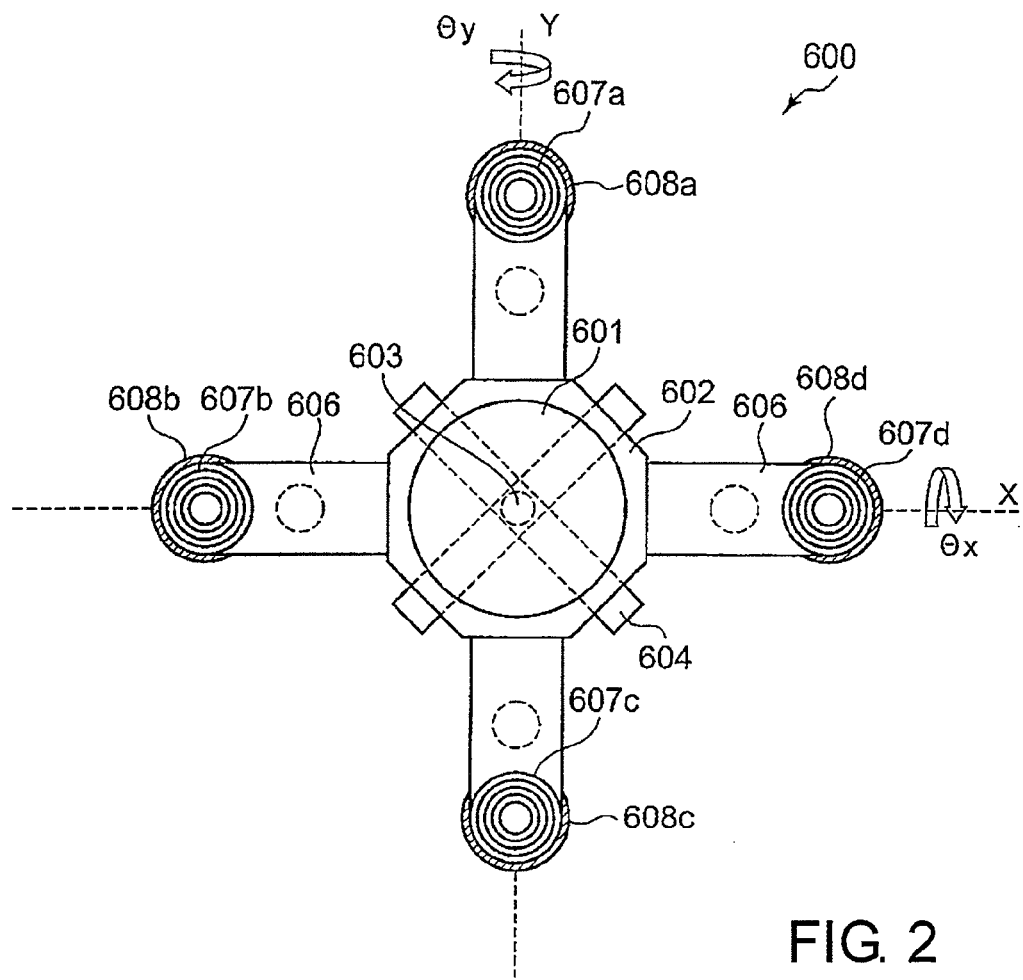
FIG. 2 is a top view illustrating a laser pointing device which is a beam pointing system according to another related art of this invention.
Figure 3:
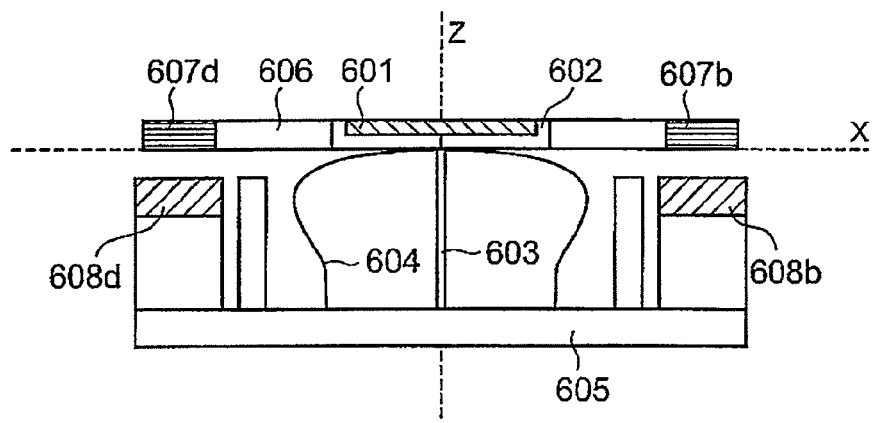
FIG. 3 is a cross-sectional view of the laser pointing device shown in FIG. 2.
Figure 4:
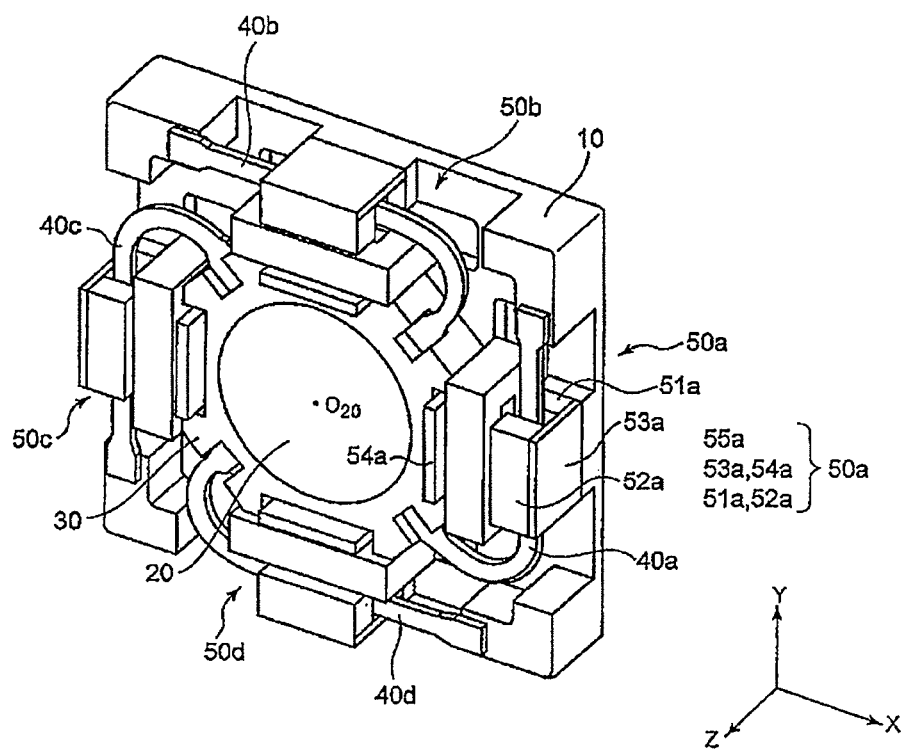
FIG. 4 is a perspective view illustrating a fast steering mirror according to a first embodiment of this invention.
Figure 5:
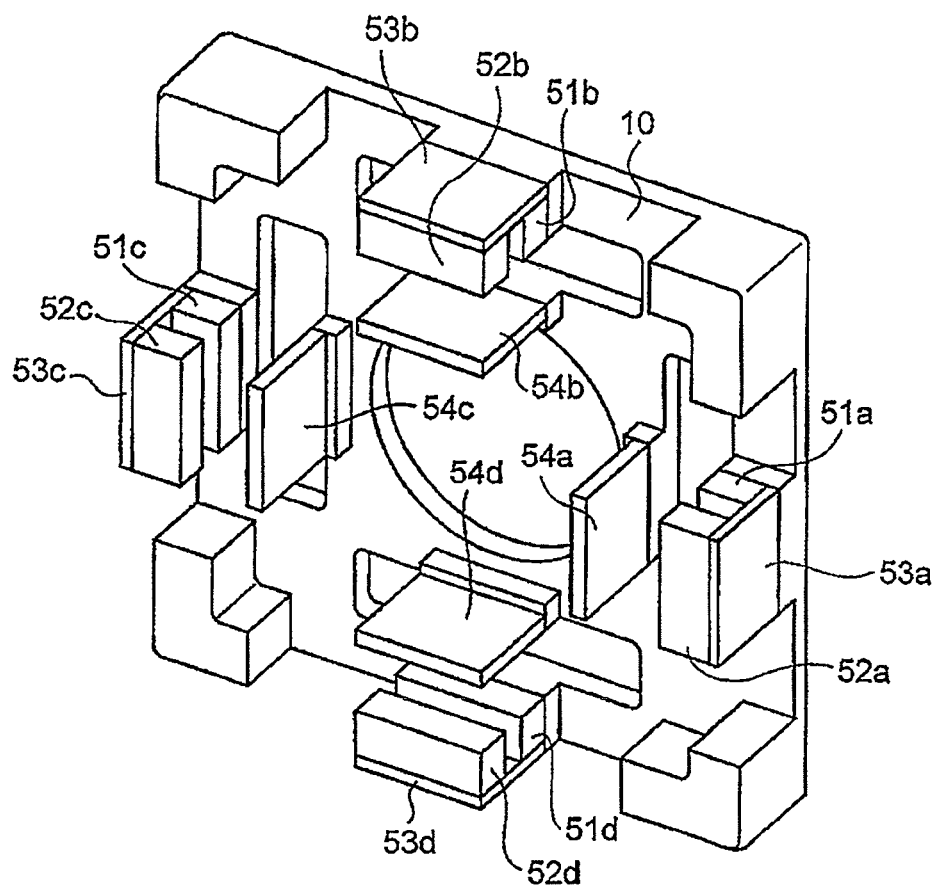
FIG. 5 is a perspective view illustrating a base and other components in the fast steering mirror shown in FIG. 4.
Figure 6:
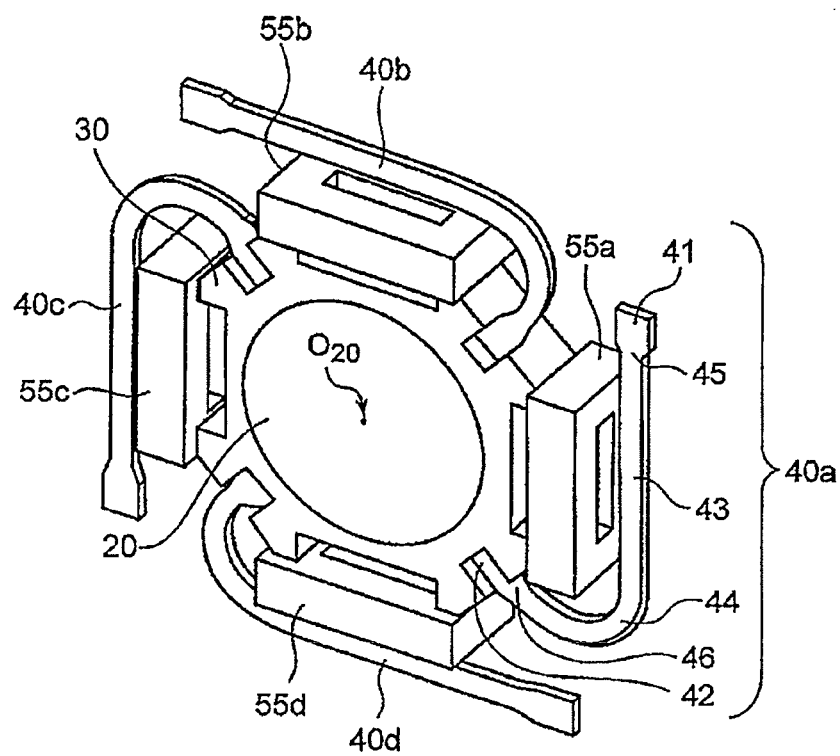
FIG. 6 is a perspective view illustrating a mirror holder and other components in the fast steering mirror shown in FIG. 4.

Referring to FIG. 4 to FIG. 6, a fast steering mirror according to a first embodiment of this invention is a biaxial-tilt-type fast steering mirror for use in an optical communication antenna of an intersatellite optical communication system using a light beam as a communication medium. This fast steering mirror has a mirror 20, a base 10, a mirror holder 30 for holding the mirror 20, an elastic member for supporting the mirror holder 30 movably relative to the base 10, and drive means for directing a reflected beam from the mirror 20 in a desired direction by driving the mirror holder 30 in response to a control signal supplied from a control circuit (not shown) to adjust the tilt angle of the mirror 20. Direction of the reflected beam includes both directions of a beam entering into the mirror 20 and a beam emitted from the mirror 20.

The elastic member has n plate springs 40a to 40d. The drive means has m drive means 50a to 50d. In this example, n and m are both 4. When the tilt actuator is a uniaxial actuator, however, n and m may be an integer of 2 or more. When the tilt actuator is a biaxial actuator like in this embodiment, n and m may be an integer of 3 or more, and preferably an integer of 4 or more.

Each of the four plate springs 40a to 40d has its surface parallel to the reflection surface of the mirror 20. The four plate springs 40a to 40d are arranged to be rotationally symmetric about the center O20 of the reflection surface of the mirror 20. Further, each of the plate springs 40a to 40d has an extending section 43. The extending sections 43 extend about the circumference of the mirror holder 30 such that the circumference of the mirror holder 30 is divided by these extending sections 43 substantially into n (4) sections. This configuration makes it possible to ensure that the plate springs have a long total length, especially long total length of flexible sections while saving the occupied space.

Each of the plate springs 40a to 40d has a shape of letter J including a curved section 44 which is bent into a curved shape in the surface direction thereof (in the direction of X-Y plane), whereby the total length of the flexible sections is made even longer. Moreover, since the curved section 44 is bent not linearly but into a curved shape, concentration of stress to the bent section can be prevented. Furthermore, each of the plate springs 40a to 40d has a fixed end 41 fixed to the base 10 and a fixed end 42 fixed to the mirror holder 30, both of which are terminated with an enlarged width. In addition, each plate spring has tapered sections before these fixed ends, which are gradually increased in width toward the fixed ends (tapered sections 45, 46). This makes it possible to alleviate the concentration of stress more effectively.

A material of the plate springs 40a to 40d must have high bearing capacity in order to ensure sufficient resistance to stress exerted during driving, must have high thermal conductivity in order to release heat generated in the coils, and must be nonmagnetic in order not to be affected by a magnet present nearby. Examples of such spring material satisfying the foregoing conditions include beryllium bronze, phosphor bronze, nickel silver, nickel, copper alloys, and so on. The plate springs 40a to 40d have a thickness in the range of 100 μm to 300 μm.

The four drive means 50a to 50d are arranged such that its cross section or virtual plane (not shown) passing through the center of the torque generated by each of the drive means 50a to 50d (the center of each of the coils 55a to 55d, in this example) is on the same plane as the reflection surface of the mirror 20, and such that they are rotationally symmetric about the center O20 of the reflection surface the mirror 20. More specifically, the drive means 50a is composed of a combination of permanent magnets 51a and 52a and yokes 53a and 54a attached to the base 1, and a coil 55a that is a solenoid coil attached to the mirror holder 30. Likewise, the drive means 50b is composed of a combination of permanent magnets 51b and 52b and yokes 53b and 54b, and a coil 55b. The drive means 50c is composed of a combination of permanent magnets 51c and 52c and yokes 53c and 54c, and a coil 55c. The drive means 50d is composed of a combination of permanent magnets 51d and 52d and yokes 53d and 54d, and a coil 55d.

In terms of this invention, the center of torque generated by the drive means can also be considered as the motion reference point or the center of motion range of a movable part of the drive means which is composed of the movable part and a fixed part.

Further, in terms of this invention, the state of rotational symmetry of the drive means includes also a state in which they are arranged at equiangular intervals (at angular intervals of 90 degrees when n=4 and m=4) about the center O20 of the reflection surface of the mirror 20, and at the equal radii from the center O20.

In the drive means 50a to 50d, gaps are provided between the permanent magnets 51a and 52a, between the permanent magnets 51b and 52b, between the permanent magnets 51c and 52c, and between the permanent magnets 51d and 52d so that the plate springs 40a to 40d pass through these gaps, respectively. The plate springs 40a to 40d are made of a nonmagnetic metal material. Further, a gap is also provided between the coils 55a to 55d and the permanent magnets 51a to 51d and 52a to 52d, and between the coils 55a to 55d and yokes 54a to 54d, respectively, in order to avoid interference between the coils and the permanent magnets or between the coils and yokes during operation.

It should be understood that the magnetic moment of the permanent magnets 51a and 51c is in the −X direction, the magnetic moment of the permanent magnets 52a and 52c is in the +X direction, the magnetic moment of the permanent magnets 51b and 51d is in the +Y direction, and the magnetic moment of the permanent magnets 52b and 52d is in the −Y direction. The coils 55a and 55c are symmetric to each other with respect to the Y-axis, and the coils 55b and 55d are symmetric to each other with respect to the X-axis.

Operation of the fast steering mirror will be described.

Figure 7:
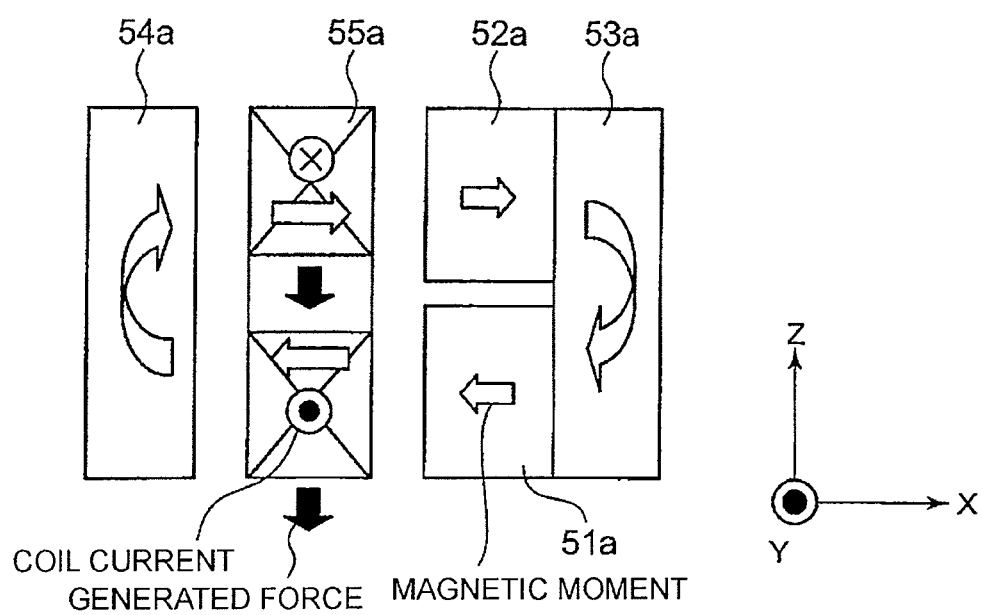
FIG. 7 is a diagram for explaining a magnetic circuit around coils in the fast steering mirror shown in FIG. 4.

Referring to FIG. 7 illustrating a magnetic circuit around the coil 55a of the fast steering mirror, a closed magnetic loop is formed along the Y-axis around the coil 55a by the permanent magnets 51a and 52a and yokes 53a and 54a. The magnetic flux direction of the lower permanent magnet 51a is −X direction, and the magnetic flux direction of the upper permanent magnet 52a is +X direction. When ring current about the X-axis is supplied to the coil 55a, a force in the +Z direction is generated in the coil 55a according to the Fleming's left-hand rule. A similar magnetic circuit is formed around the coils 55b to 55d as well.

Figure 8:
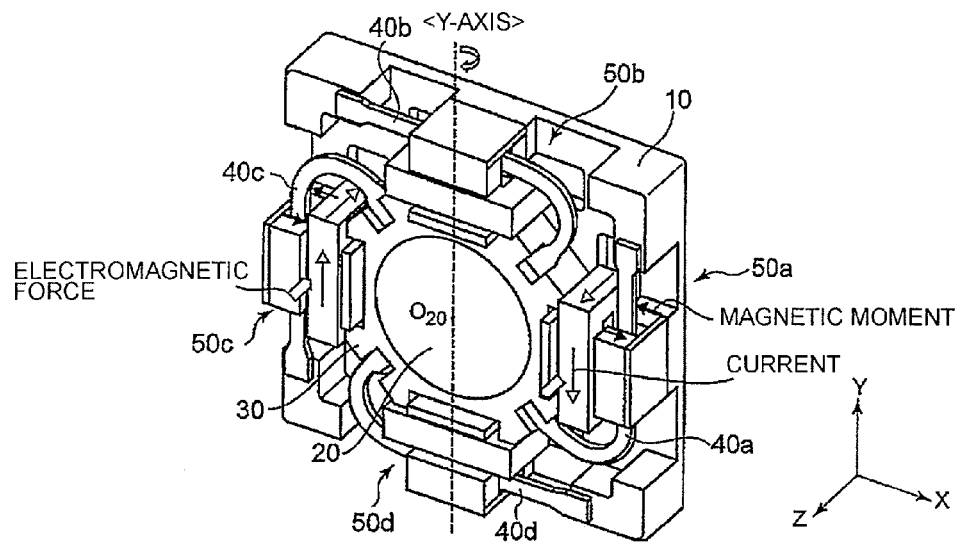
FIG. 8 is a perspective view for explaining how tilt drive is performed about the Y axis in the fast steering mirror shown in FIG. 4.

Referring further to FIG. 8, clockwise current is supplied to the coil 55a which is wound around the X-axis (FIG. 6), and counterclockwise current is supplied to the coil 55c (FIG. 6). When the magnetic moments are arranged as shown in the drawing, the coil 55a is subject to a force in the +Z direction, while the coil 55c is subject to a force in the −Z direction, whereby the mirror 20 is tilted about the Y-axis. The cross-sectional plane passing through the center of torque of the drive means 50a (the center of the coil 55a in this example) and the center of torque of the drive means 50c (the center of the coil 55c in this example) is on the same plane as the reflection surface of the mirror 20 held by the mirror holder 30. Accordingly, the tilt of the reflection surface of the mirror 20 will involve no displacement in the Z direction.

Figure 9:
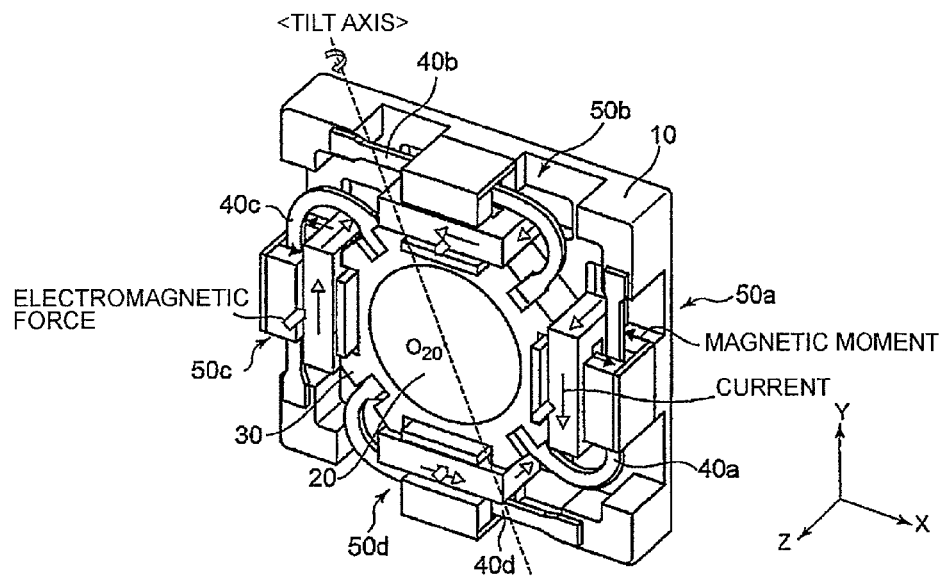
FIG. 9 is a perspective view for explaining how tilt drive is performed about an arbitrary rotation axis in the fast steering mirror shown in FIG. 4.

In place of the tilt drive shown in FIG. 8, the direction of the tilt axis can be adjusted to a desired direction by supplying current not only to the coils 55a and 55c but also to the coil 55b (FIG. 6) and the coil 55d (FIG. 6), as shown in FIG. 9, and adjusting the magnitude relationship between theses currents.

Although, in this example, a gap is provided between two permanent magnets in each of the drive means 50a to 50d so that the plate springs 40a to 40d are arranged to pass through these gaps, a single permanent magnet having a cross-sectional shape of letter U may be provided in each of the drive means so that the plate spring is passed through the gap between a pair of legs of the U-shape. In this case, the closed magnetic loop can be formed even if the yoke attached to the permanent magnet (the yoke 53a in the configuration shown in FIG. 7) is omitted.

Alternatively, in each of the drive means 50a to 50d, the yoke may have a cross-sectional shape of letter I, and the permanent magnet also having a cross-sectional shape of letter I may be attached to the base at a position spaced from the yoke, and the coil may be attached to the mirror holder between the permanent magnet and the yoke such that the coil passes across a closed magnetic loop generated by the permanent magnet and the yoke. In this case, the permanent magnet may be composed of first and second permanent magnet portions which are arranged along the letter I so as to abut to each other with their magnetic poles oppositely oriented.

Second Embodiment

Figure 10:
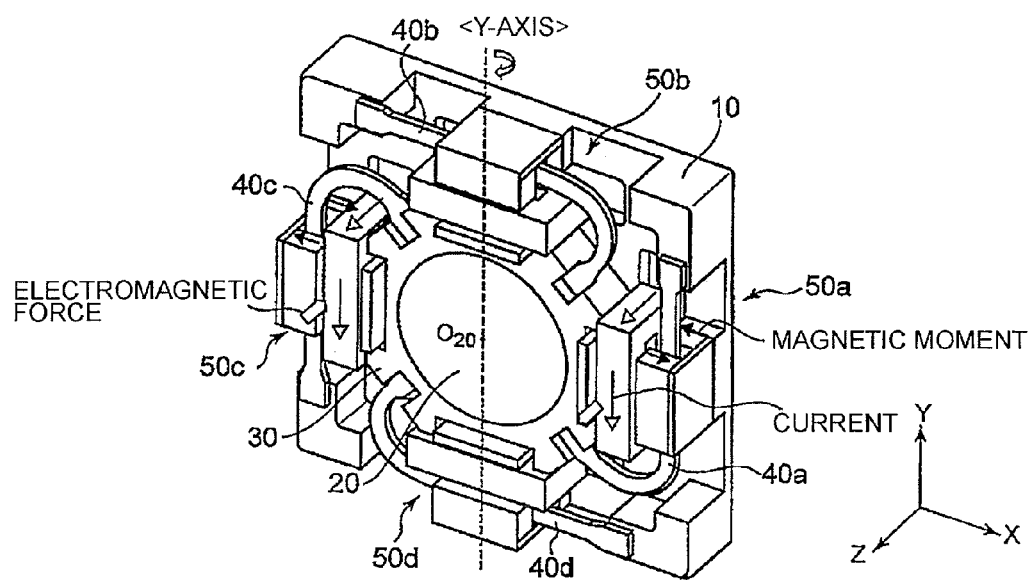
FIG. 10 is a perspective view for explaining magnetic arrangement and a direction of coil current in a fast steering mirror according to a second embodiment of this invention.

Although, in the first embodiment, coil current is caused to flow in the direction as shown in FIG. 8 with the arrangement of the magnets shown in FIG. 5, the arrangement of the magnets and the direction of coil current may be those as shown in FIG. 10. In this case, the magnetic moment of the permanent magnet 51a and the permanent magnet 52c is in the −X direction, and the magnetic moment of the permanent magnet 51c and the permanent magnet 52a is in the +X direction, while current flows through the coil 55a and the coil 55c in the same direction.

Third Embodiment

Figure 11:
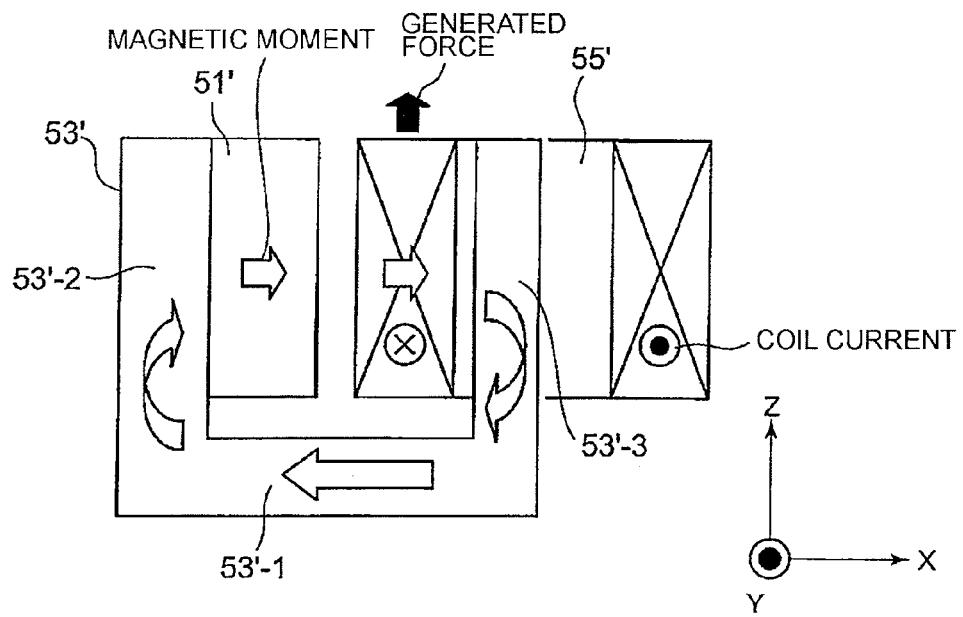
FIG. 11 is a diagram illustrating a magnetic circuit in a fast steering mirror according to a third embodiment of this invention.

Although, in the first embodiment, the coils 55a to 55d are wound around the X-axis or the Y-axis, they may be wound around the Z-axis. FIG. 11 shows an example of a magnetic circuit corresponding to the coil 5 wound around the Z-axis.

Referring to FIG. 11, a yoke 53' fixed to a base (not shown) has a cross-sectional shape of letter U consisting of a base portion 53'-1 and a pair of standing portions 53'-2 and 53'-3. A magnet 51' is arranged on the inner side of the standing portion 53'-2 of the yoke 53', whereby a closed magnetic loop is formed about the Y-axis. A coil 55' attached to a mirror holder with a mirror (not shown) is arranged movably in the direction of the Z-axis such that it surrounds the other standing portion 53'-3 of the yoke 53. Force is generated in the +Z direction by supplying coil current about the Z-axis, whereby the mirror holder (mirror) is driven.

Fourth Embodiment

Figure 14:
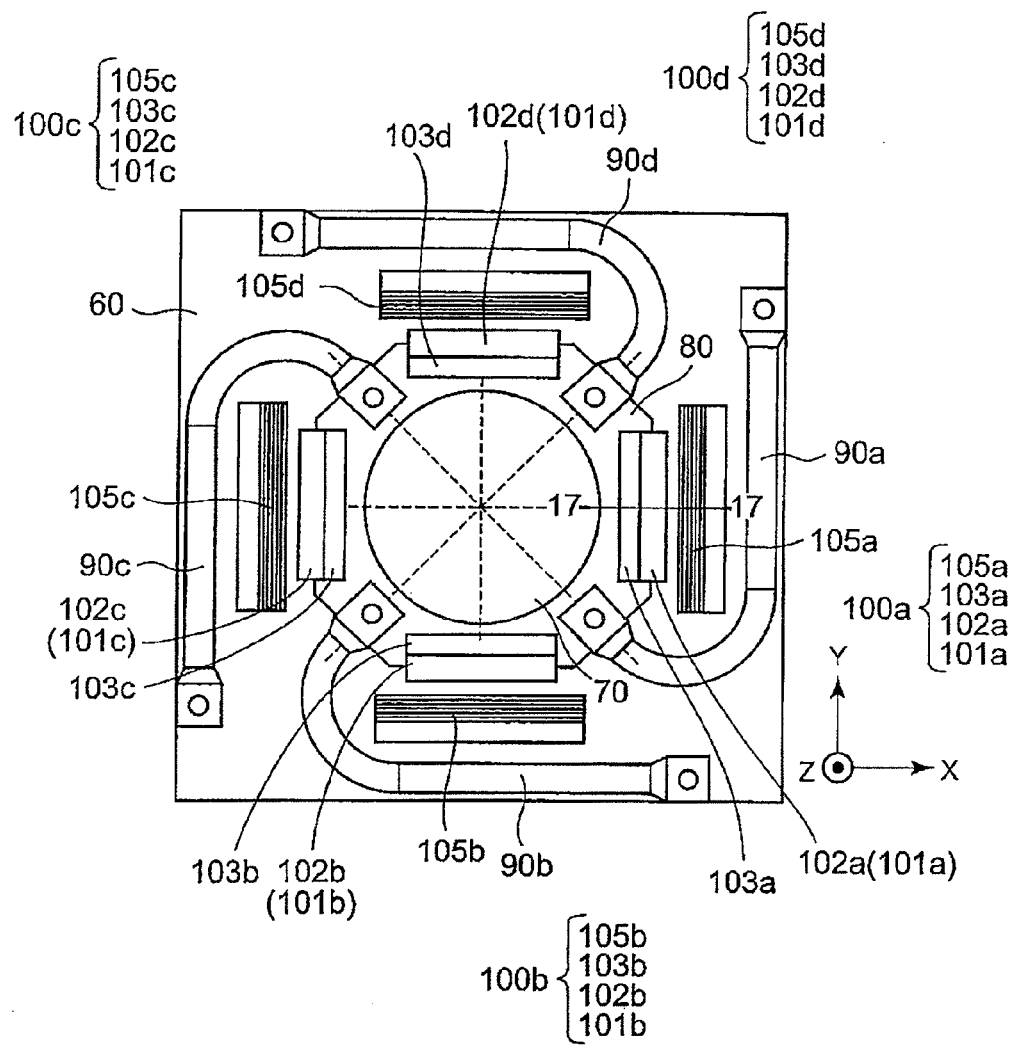
FIG. 14 is a top view illustrating a fast steering mirror according to a fourth embodiment of this invention.
Figure 15:
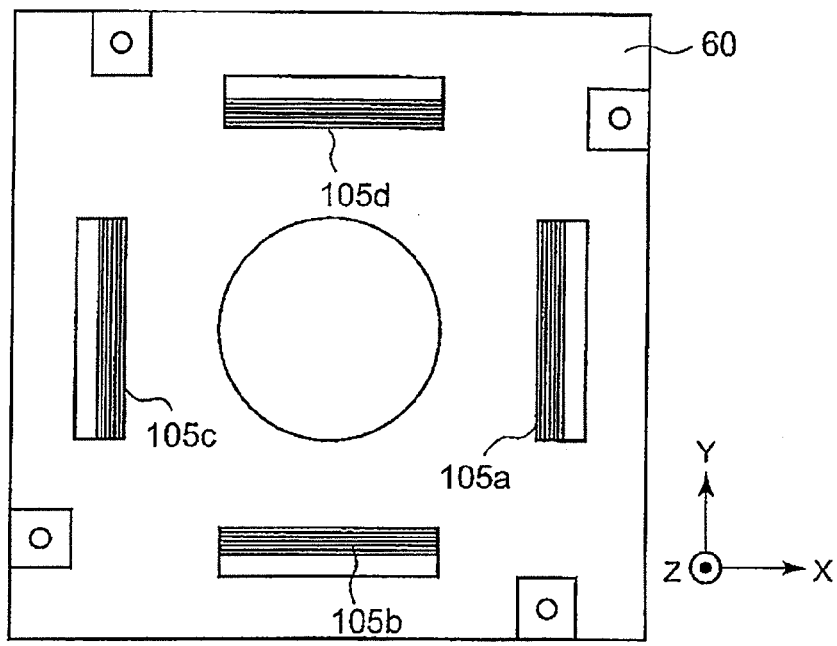
FIG. 15 is a top view illustrating a base and other components in the fast steering mirror shown in FIG. 14.
Figure 16:
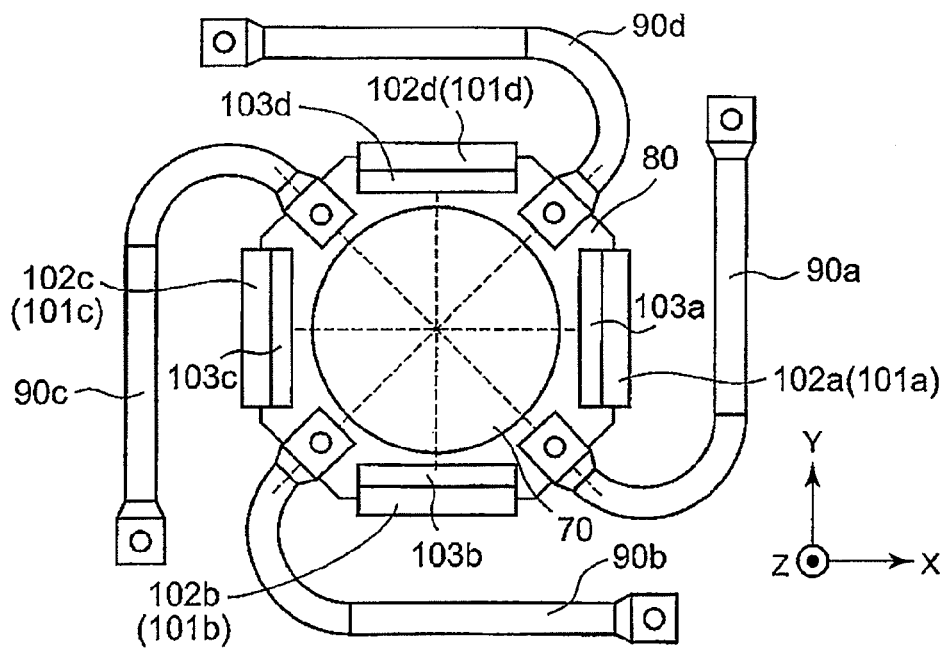
FIG. 16 is a top view illustrating a mirror holder and other components in the fast steering mirror shown in FIG. 14.

Referring to FIG. 14 to FIG. 16, a fast steering mirror according to a fourth embodiment of this invention is a biaxial fast steering mirror for use in an optical communication antenna of an intersatellite optical communication system which uses a light beam as a communication medium. The fast steering mirror has a mirror 70, a base 60, a mirror holder 80 for holding the mirror 70, an elastic member for supporting the mirror holder 80 movably relative to the base 60, and drive means for directing a reflected beam reflected by the mirror 70 in a desired direction by driving the mirror holder 80 according to a control signal supplied from a control circuit (not shown) to adjust the tilt angle of the mirror 70. Direction of the reflected beam includes both directions of a beam entering into the mirror 70 and a beam emitted from the mirror 70.

The elastic member consists of n plate springs 90a to 90d. The drive means consists of m drive means 100a to 100d. In this example, n and m are both 4. When the tilt actuator is a uniaxial actuator, however, n and m may be an integer of 2 or more. When the tilt actuator is a biaxial actuator like in this embodiment, n and m may be an integer of 3 or more, and preferably an integer of 4 or more.

This fourth embodiment is different from the first embodiment, firstly, in that coils 105a to 105d are attached to the base, and permanent magnets 101a to 101d, 102a to 102d, and yokes 103a to 103d are attached to the movable part. Whereas in the fast steering mirror according to the first embodiment, the plate springs 40a to 40d are made of a material having high thermal conductivity in order to dissipate heat generated by the coils 55a to 55d to the outside, the fast steering mirror according to this embodiment has no need of dissipating heat generated by the coils 105a to 105d, and hence the plate springs 90a to 90d can be made of a material having low thermal conductivity.

The fourth embodiment is different from the first embodiment, secondly, in that only one yoke is attached, respectively, to the pair of permanent magnets 101a and 102a, the pair of permanent magnets 101b and 102b, the pair of permanent magnets 101c and 102c, and the pair of permanent magnets 101d and 102d. This makes it possible to realize reduction in size and weight of the movable parts.

The fourth embodiment is different from the first embodiment, thirdly, in that the pair of permanent magnets 101a and 102a, the pair of permanent magnets 101b and 102b, the pair of permanent magnets 101c and 102c, and the pair of permanent magnets 101d and 102d are in contact with each other. This makes it possible to realize reduction in thickness of the movable parts.

The fourth embodiment is different from the first embodiment, fourthly, in that the plate springs 90a to 90d are arranged at positions spaced from the permanent magnets 101a to 101d and 102a to 102d. This eliminates the need of using a nonmagnetic material for the plate springs 90a to 90d, making it possible to use a magnetic material such as stainless steel.

The arrangement, shape, and thickness of the four plate springs 90a to 90d are the same as those of the plate springs 40a to 40d in the first embodiment. The 90a to 90d are respectively disposed at positions outside the coils 105a to 105d such that the plate springs will not interfere with the drive means 100a to 100d during operation. The arrangement of the four drive means 100a to 100d is the same as that of the drive means 50a to 50d in the first embodiment.

The magnetic moment of the permanent magnets 101a and 101c is in the −X direction, the magnetic moment of the permanent magnets 102a and 102c is in the +X direction, the magnetic moment of the permanent magnets 101b and 101d is in the +Y direction, and the magnetic moment of the permanent magnets 102b and 102d is in the −Y direction. The coils 105a and 105c are symmetric to each other with respect to the Y-axis, and the coils 105b and 105d are symmetric to each other with respect to the X-axis.

Operation of the fast steering mirror according to the fourth embodiment will be described.

Figure 17:
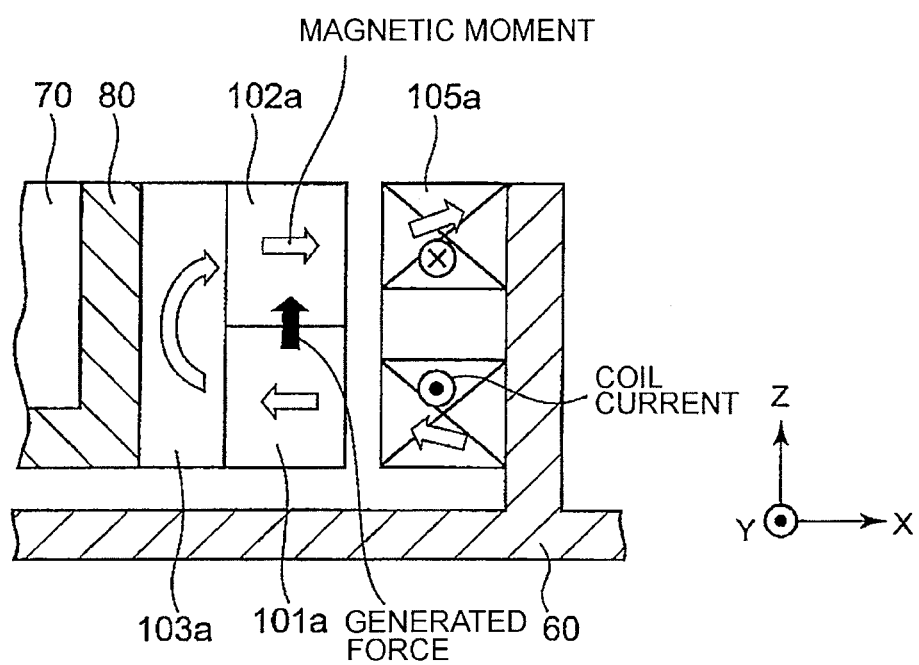
FIG. 17 is a cross-sectional view taken about the cut line 17-17 of FIG. 14 for explaining a magnetic circuit in the fast steering mirror shown in FIG. 14.

Referring to FIG. 17 illustrating a magnetic circuit around the drive means 100a of the fast steering mirror, a magnetic flux is generated in the coil 105a orthogonally to the Y-axis by the permanent magnets 101a and 102a and the yoke 103a. The direction of magnetic flux in the permanent magnet 101a in the lower part of the drawing is the −X direction, whereas the direction of magnetic flux in the permanent magnet 102a in the upper part of the drawing is the +X direction. However, since no yoke is present in the +X direction of the coil 105a, the magnetic circuit remains open without generating a closed magnetic loop, and the magnetic flux coil 105a is open in the ±Z directions.

When ring current around the X-axis is supplied to the coil 105a which is located to pass across an extension line of the open magnetic circuit formed by the permanent magnets 101a and 102a and the yoke 103a, a force is generated in the −Z direction in the coil 105a according to the Fleming's left-hand rule. However, since the coil 105a is fixed to the base 80, a counteracting force in the +Z direction is generated in the mirror holder 80. Similar magnetic fluxes are generated around the coils 105b to 105d.

Figure 18:
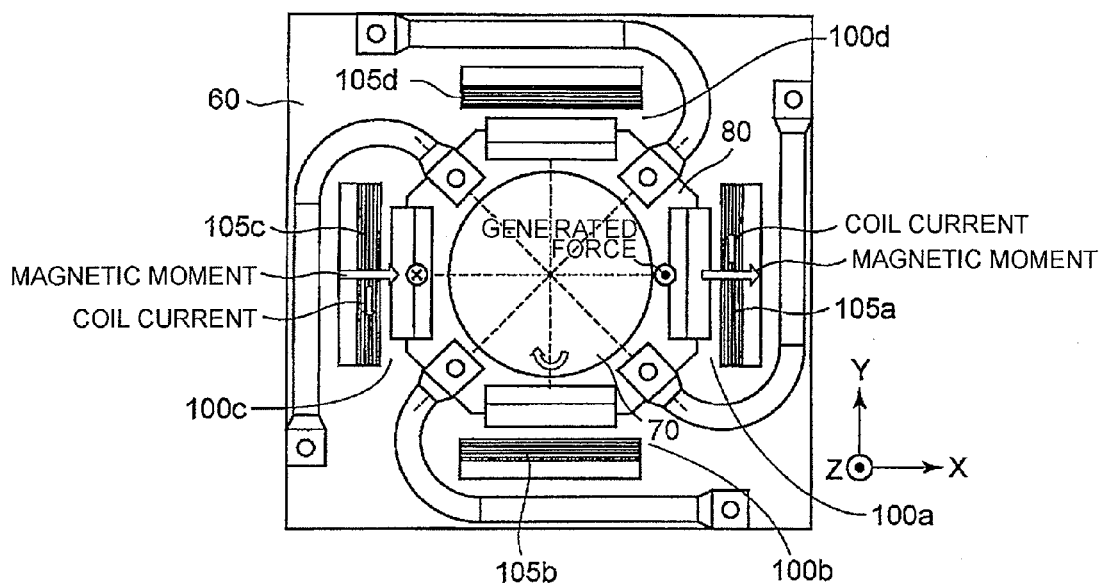
FIG. 18 is a top view for explaining how tilt drive is performed around the Y axis in the fast steering mirror shown in FIG. 14.

Referring to FIG. 18, counterclockwise current is supplied to the coil 105a which is wound around the X-axis, and clockwise current is supplied to the coil 105c. When the magnetic moments are arranged as shown in the drawing, a force in the +Z direction acts on the +X side of the mirror holder 80, and a force in the −Z direction acts on the −X side of the mirror holder 80, whereby the mirror 70 is tilted about the Y-axis. Since a cross-sectional plane passing through the center of torque of the drive means 100a (the center of the coil 105a in this example) and the center of torque of the drive means 100c (the center of the coil 105c in this example) is on the same plane as the reflection surface of the mirror 70 held by the mirror holder 80, the reflection surface of the mirror 70 can be tilted without involving displacement in the Z direction.

In place of the tilt drive shown in FIG. 18, the direction of the tilt axis can be adjusted arbitrarily by supplying current not only to the coil 105a and coil 105c but also to the coils 105b and 105d to adjust the magnitude relationship between these currents.

In each of the drive means 100a to 100d according this fourth embodiment, as shown in FIG. 17, two permanent magnets are attached to a yoke having a cross-sectional shape of letter I so as to abut to each other with their magnetic poles oppositely oriented. However, an open magnetic circuit having the same configuration as that of the FIG. 17 can be obtained by attaching a single permanent magnet having a cross-sectional shape of letter I to the yoke.

Fifth Embodiment

Although the fourth embodiment employs the magnet arrangement and direction of coil current as shown in FIG. 17 and FIG. 18, magnet arrangement and direction of coil current other than these may be employed.

For example, a configuration may be employed in which the magnetic moment of the permanent magnet 101 and the permanent magnet 102c set to the −X direction, the magnetic moment of the permanent magnet 101c and the permanent magnet 102a is set to the +X direction, and current is supplied to the coil 105a and the coil 105c in the same direction. According to this configuration, a force in the +Z direction acts on the +X side of the mirror holder 80, and a force in the −Z direction acts on the −X side of the mirror holder 80, whereby the mirror 70 is tilted about the Y-axis. In this case as well, the reflection surface of the mirror 70 can be tilted without involving displacement in the Z direction, since a cross-sectional plane passing through the center of torque of the drive means 100a (the center of the coil 105a in this example) and the center of torque of the drive means 100c (the center of the coil 105c in this example) is on the same plane as the reflection surface of the mirror 70 held by the mirror holder 80.

Sixth Embodiment

Although in the fourth and fifth embodiments, each of the drive means 100a to 100d has one yoke 103a to 103d, the drive means may have no yoke at all. Specifically, each of the drive means is composed of a coil attached to a base, and a permanent magnet having a cross-sectional shape of letter I and attached to a mirror holder, while the coil may be attached to the base at a position spaced from the permanent magnet and so as to pass across the extension line of an open magnetic circuit generated by the permanent magnet.

Other Embodiments

Although in the first to sixth embodiments, the plate spring 40a to 40d and the plate springs 90a to 90d are formed of J-shaped thin parallel plates, the number of the extension portions bent into a curved shape is not limited to one but may be two or more.

The plate springs 40a to 40d need not necessarily be inserted in gaps between the permanent magnets 51a to 51d and the permanent magnets 52a to 52d, but may be extended, for example, to an outer peripheral direction of the yokes 53a to 53d.

Further, the plate springs 40a to 40d may be used as wiring for supplying drive current to the coils 55a to 55d attached to the mirror holder 30.

Although in the first to third embodiments, a moving coil system is employed in which the permanent magnets 51a to 51d and 52a to 52d are attached to the base 10 as a fixed member while the coils 55a to 55d are attached to the mirror holder 30 as a movable member, a moving magnet system may be employed in which the coils are attached to the fixed member while the magnets are attached to the movable member.

Although in the fourth to sixth embodiments, a moving coil system is employed in which the coils 105a to 105d are attached to the base 60 as a fixed member while the permanent magnets 101a to 101d, and 102a to 102d are attached to the mirror holder 80 as a movable member, a moving coil system may be employed in which the magnets are attached to the fixed member while the coils are attached to the movable member.

[Stress and Vibration Analysis]

Advantageous effects of the fast steering mirror according to the first embodiment of the invention shown in FIG. 4 will be described in comparison with a comparative example, with reference to results of vibration analysis (stress analysis) obtained by a finite element method.

Figure 12:
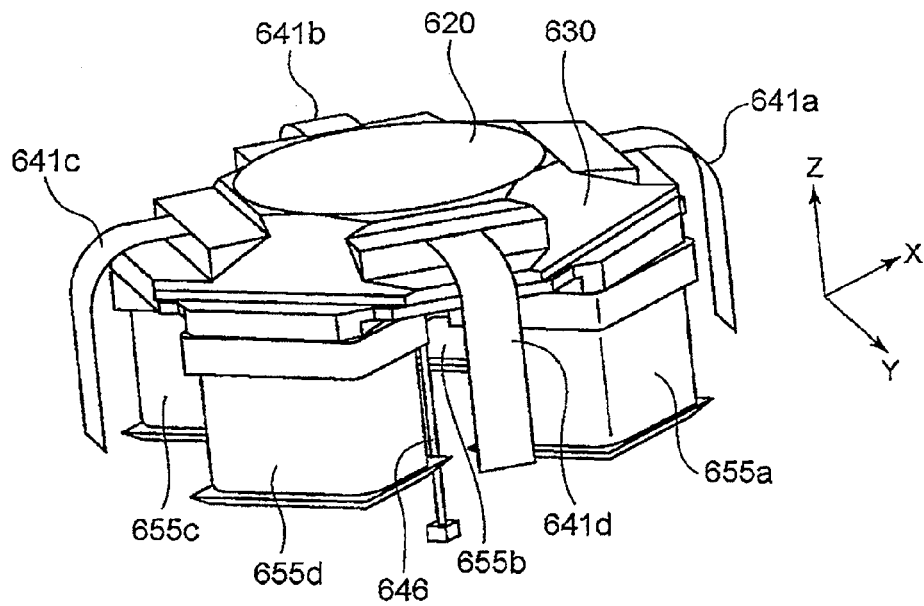
FIG. 12 is a perspective view illustrating fast steering mirror which is used as a comparison example of this invention in a vibration analysis experiment.

FIG. 12 shows a comparative example. This comparative example includes elements of Patent Document 2, and a mirror holder 630 is fixed to a base (not shown) by means of four leaf springs 641a to 641d which are bent from an X-Y plane in the Z-axis direction, and a torsion bar 646 extending from the back side of the mirror holder 630 in the Z-axis direction.

Table 1 below shows parameters of specimens.

TABLE 1

| Parameters of specimens | | | |
|---|---|---|---|
| | | 1$^{st}$ embodiment (FIG. 4) | Comparative example (FIG. 12) |
| Mirror | Material | Quartz glass | Quartz glass |
| | Diameter | 20 mm | 20 mm |
| mirror holder | Material | Aluminum | Aluminum |
| Spring | Material | Beryllium copper | Beryllium copper |
| | Width | 2 mm (narrowest part) | 3 mm |
| | Thickness | 230 μm | 80 μm |
| | Total length | 40 mm | 15 mm |
| Torsion bar | Material | NA | Stainless steel |
| | Diameter | NA | 0.4 mm |

As shown in Table 1, the dimensions of the springs of the first embodiments and the comparative example are set such that their tilt drive sensitivities become equal to each other. In the comparative example, the thickness of the leaf springs 641a to 641d is small and the diameter of the torsion bar 646 is small.

Table 2 shows a result of analysis of maximum stress exerted on the springs and the torsion bar when the mirror is tilted by 4 degrees about the Y-axis.

TABLE 2

| Maximum stress of elastic body | | | |
|---|---|---|---|
| | 1$^{st}$ embodiment (FIG. 4) | Comparative example (FIG. 12) | Bearing capacity |
| Maximum stress on springs | 188 N/mm$^2$ | 210 N mm$^2$ | 660 N/mm$^2$ |
| Maximum stress on torsion bar | NA | 1030 N/mm$^2$ | 650 N/mm$^2$ |

As is seen from Table 2, in the embodiment of this invention, the maximum stress on the plate springs is lower than that in the comparative example by 10%, and is within the range of 30% of the bearing capacity, which means that the plate springs are strong enough for use.

In the comparative example, in contrast, the maximum stress of the torsion bar 646 exceeds the standard bearing capacity, and thus the torsion bar 646 may possibly be broken. A point of the torsion bar 646 which is subject to a maximum stress is a point near the contact between the torsion bar 646 and the mirror holder 630.

The reason why this invention can realize both of alleviation of concentration of stress and high tilt drive efficiency is that the plate springs as elastic bodies for supporting the mirror holder as a movable member are sufficiently large in size. In other words, the plate springs in the fast steering mirror according to the invention are long enough and thick enough to alleviate the stress. In addition, these long plate springs are provided with an extending section bent into a curved shape or a tapered section, whereby the stress can be alleviated further more.

In contrast, in the case of a fast steering mirror using a torsion bar as in the comparative example or Patent Document 2, the torsion bar must be formed to have a small diameter and the springs also must be formed to have a small thickness in order to ensure high tilt drive efficiency. When the elastic bodies are small in size like these, stress will be concentrated during tilt driving. In the biaxial gimbal fast steering mirror described in Patent Document 1 as well, the elastic pivot supporting the movable part is so small in size that stress is concentrated therein.

Figure 13:
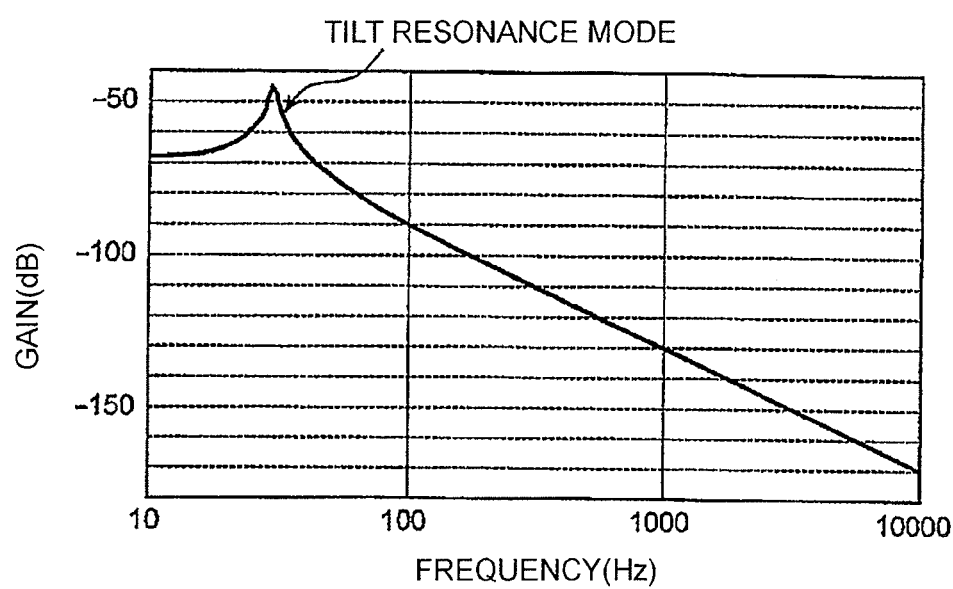
FIG. 13 is a diagram illustrating a result of vibration analysis of generated tilt by finite element method conducted on the fast steering mirror shown in FIG. 4.

The fast steering mirror according to this invention exhibits advantageous effects in vibration characteristics as well. FIG. 13 shows a result of vibration analysis of generated tilt by a finite element method conducted on the fast steering mirror according to the first embodiment of the invention. Various parameters of specimens used in the vibration analysis are the same as those shown in Table 1.

As is obvious from FIG. 13, a tilt resonance mode is present in the vicinity of 30 Hz, and no such undesired mode as involving anti-resonance is present in a frequency range higher than that. This is because, in the fast steering mirror according to the invention, the cross-sectional plane passing through the centers of torque generated by the plurality of drive means is on the same plane as the reflection surface of the mirror. This means that the tilt of the reflection surface of the mirror does not involve displacement in other directions, and hence no extra resonance is generated.

In addition, in the fast steering mirror according to this invention, the plate springs are directly attached to the outer edge of the mirror holder, and the plate springs extend about the periphery of the mirror holder and are fixed to the base. Accordingly, the fast steering mirror of this invention is more compact as a whole than those of Patent Document 1, the comparative example, and Patent Document 2.

The whole or part of the exemplary embodiment disclosed above can be described as the following supplementary notes, but is not limited to them.

(Supplementary Note 1) A fast steering mirror comprising: a mirror, a base; a mirror holder for holding the mirror; an elastic member for supporting the mirror holder movably relative to the base; and drive means for directing a reflected beam from the mirror to a desired direction by driving the mirror holder in response to a control signal to adjust the tilt angle of the mirror, wherein: the fast steering mirror has n plate springs as the elastic member, and m drive means as the drive means, n and m being integers of 2 or more; the n plate springs are arranged such that their surfaces are parallel to the reflection surface of the mirror and such that the plate springs are rotationally symmetric to each other about the center of the reflection surface of the mirror, and the n plate springs each have a section extending along the circumference of the mirror holder, the section being obtained by dividing the perimeter of the mirror holder substantially into n sections; the m drive means have cross-sections passing through the centers of the torque generated by the respective drive means which are on the same plane as the reflection surface of the mirror, and are arranged to be rotationally symmetric to each other about the center of the reflection surface of the mirror (the first embodiment (FIG. 4 to FIG. 9), the second embodiment (FIG. 10)).

(Supplementary Note 2) The fast steering mirror as described in Supplementary Note 1 wherein n is 4 and m is 4 (the first embodiment (FIG. 4 to FIG. 9), the second embodiment (FIG. 10)).

(Supplementary Note 3) The fast steering mirror as described in Supplementary Note 1 or 2, each of the n plate springs has its ends fixed to the base and fixed to the mirror holder, the fixed ends being broadened, and the sections before these fixed ends are tapered such that the width of the leaf spring becomes gradually increased (the first embodiment (FIG. 4 to FIG. 9), the second embodiment (FIG. 10)).

(Supplementary Note 4) The fast steering mirror as claimed in any one of Supplementary Notes 1 to 3, wherein each of the n plate springs has a section extending in a curved shape in the direction of the surface thereof (the first embodiment (FIG. 4 to FIG. 9), the second embodiment (FIG. 10)).

(Supplementary Note 5) The fast steering mirror as described in any one of Supplementary Notes 1 to 4, wherein each of the m drive means is composed of a combination of a permanent magnet and a yoke attached to the base, and a coil attached to the mirror holder (the first embodiment (FIG. 4 to FIG. 9), the second embodiment (FIG. 10)).

(Supplementary Note 6) The fast steering mirror as described in any one of Supplementary Notes 1 to 4, wherein each of the m drive means is composed of a coil attached to the base and a combination of a permanent magnet and a yoke attached to the mirror holder (the fourth embodiment (FIG. 14 to FIG. 18), fifth embodiment).

(Supplementary Note 7) The fast steering mirror as described in Supplementary Note 5 or 6, wherein: the yoke has a cross-sectional shape of letter I; the permanent magnet has a cross-sectional shape of letter U consisting of a base portion and a pair of standing portions provided upright at the opposite ends of the base portion, and is attached to the base at a position spaced from the yoke and such that the pair of standing portions are directed toward the yoke; the coil is attached to the mirror holder at a position between the yoke and the pair of standing portions of the permanent magnet such that the coil passes across a closed magnetic loop formed by the yoke and the base portion and the pair of standing portions of the permanent magnet; and each of the plate springs extends through a gap between the pair of standing portions of the permanent magnet and is made of a nonmagnetic metal material (the first modification of first embodiment (FIG. 7)).

(Supplementary Note 8) The fast steering mirror as described in Supplementary Note 5 or 6, wherein: the yoke has a cross-sectional shape of letter I; the permanent magnet also has a cross-sectional shape of letter I and is attached to the base at a position spaced from the yoke; and the coil is attached to the mirror holder at a position between the permanent magnet and the yoke such that the coil passes across a closed magnetic loop formed by the permanent magnet and the yoke (the second modification of the first embodiment (FIG. 7)).

(Supplementary Note 9) The fast steering mirror as described in Supplementary Note 8, wherein the permanent magnet is composed of first and second permanent magnet portions (51*a*, 52*a*) which are arranged along the letter I so as to abut to each other with their magnetic poles oppositely oriented (the third modification of the first embodiment (FIG. 7)).

(Supplementary Note 10) The fast steering mirror as described in Supplementary Note 5 or 6, wherein: the yoke has a cross-sectional shape of letter U consisting of a base portion (53'-1) and a pair of standing portions (53'-2, 53'-3) provided upright at the opposite ends of the base portion; the permanent magnet is attached on the inner side surface of one of the pair of standing portions (53'-2) of the yoke; the coil is attached to the mirror holder such that the coil surrounds the other one of the pair of standing portions (53'-3) of the yoke, and such that the coil passes across a closed magnetic loop formed by the permanent magnet and the base portion and the pair of standing portions of the yoke (the third embodiment (FIG. 11)).

(Supplementary Note 11) The fast steering mirror as described in any one of Supplementary Notes 5 to 10, wherein: the yoke is composed of a first and second yoke portions (53a, 54a) having a cross-sectional shape of letter I and attached to the base at positions spaced from each other; the permanent magnet is composed of first and second permanent magnet portions (51a, 52a) attached to the first yoke portion such that the magnet portions are arranged with a gap therebetween along the letter I, and such that the magnet portions abut to each other with their magnetic poles oppositely oriented; the coil is attached to the mirror at a position between the second yoke portion and the first and second permanent magnet portions attached to the first yoke portion, such that the coil passes across a formed by the first and second permanent magnet portions and the first and second yoke portions; and each of the plate springs extends through a gap between the first and second permanent magnet portions and is made of a nonmagnetic metal material (the first embodiment (FIG. 7)).

(Supplementary Note 12) The fast steering mirror as described in any one of Supplementary Notes 5 to 11, wherein the plate springs are used also as wiring for supplying drive current to the coil attached to the mirror holder (other embodiments).

(Supplementary Note 13) The fast steering mirror as described in any one of Supplementary Notes 6 to 10, wherein: the yoke has a cross-sectional shape of letter I and is attached to the mirror holder; the permanent magnet has a cross-sectional shape of letter I and is attached to the mirror holder via the yoke; and the coil is attached to the base at a position between the permanent magnet and the yoke such that the coil passes across an extension line of an open magnetic circuit formed by the permanent magnet and the yoke (the modification of the fourth embodiment (FIG. 17)).

(Supplementary Note 14) The fast steering mirror as claimed in claim 13, wherein the permanent magnet is composed of first and second permanent magnet portions (101a, 102a) which are arranged along the letter I so as to abut to each other with their magnetic poles oppositely oriented (the fourth embodiment (FIG. 17)).

(Supplementary Note 15) The fast steering mirror as described in any one of Supplementary Notes 1 to 4, wherein: each of the m drive means is composed of a permanent magnet attached to the base and a coil attached to the mirror holder; the permanent magnet has a cross-sectional shape of letter I; and the coil is attached to the mirror holder so as to pass across an extension line of an open magnetic circuit formed by the permanent magnet (the modification of the sixth embodiment).

(Supplementary Note 16) The fast steering mirror as described in any one of Supplementary Notes 1 to 4, wherein: each of the m drive means is composed of a coil attached to the base and a permanent magnet attached to the mirror holder; the permanent magnet has a cross-sectional shape of letter I; and the coil is attached to the base so as to pass across an extension line of an open magnetic circuit formed by the permanent magnet (the sixth embodiment).

(Supplementary Note 17) An optical communication antenna having the fast steering mirror as described in any one of Supplementary Notes 1 to 16.

(Supplementary Note 18) An intersatellite optical communication system having the optical communication antenna as described in Supplementary Note 17.

Although this invention has been described in conjunction with a few preferred embodiments thereof, this invention is not limited to the foregoing embodiments but may be modified in various other manners within the scope of the appended claims. For example, the type of actuator is not limited to the biaxial type as described in the embodiments but may be a uniaxial type. The actuator of the invention is applicable not only as a fast steering mirror for use in an optical antenna device of an intersatellite communication system, but also as an actuator for controlling orientation of a member other than a mirror, which requires orientation control.

This application is based upon and claims the benefit of priority from Japanese Patent Application No. 2009-168844 filed Jul. 17, 2009, and Japanese Patent Application No. 2010-076888 filed Mar. 30, 2010, the disclosure of which is incorporated herein in its entirety by reference.

The invention claimed is:

1. A fast steering mirror comprising:
a mirror;
a base;
a mirror holder for holding the mirror;
an elastic member for supporting the mirror holder movably relative to the base; and
drive means for directing a reflected beam from the mirror to a desired direction by driving the mirror holder in response to a control signal to adjust the tilt angle of the mirror,
wherein:
the fast steering mirror has n plate springs as the elastic member, and m drive means as the drive means, n and m being integers of 2 or more;
the n plate springs are arranged such that their surfaces are parallel to the reflection surface of the mirror and such that the plate springs are rotationally symmetric to each other about the center of the reflection surface of the mirror, and the n plate springs each have a section extending along the circumference of the mirror holder, the section being obtained by dividing the perimeter of the mirror holder substantially into n sections;
the m drive means have cross-sections passing through the centers of the torque generated by the respective drive means which are on the same plane as the reflection surface of the mirror, and are arranged to be rotationally symmetric to each other about the center of the reflection surface of the mirror.

2. The fast steering mirror as claimed in claim 1, wherein n is 4 and m is 4.

3. The fast steering mirror as claimed in claim 1, wherein each of the n plate springs has its ends fixed to the base and fixed to the mirror holder, the fixed ends being broadened, and the sections before these fixed ends are tapered such that the width of the leaf spring becomes gradually increased.

4. The fast steering mirror as claimed in claim 1, wherein each of the n plate springs has a section extending in a curved shape in the direction of the surface thereof.

5. The fast steering mirror as claimed in claim 1, wherein each of the m drive means is composed of a combination of a permanent magnet and a yoke attached to the base, and a coil attached to the mirror holder.

6. The fast steering mirror as claimed in claim 1, wherein each of the m drive means is composed of a coil attached to the base and a combination of a permanent magnet and a yoke attached to the mirror holder.

7. The fast steering mirror as claimed in claim 5, wherein:
the yoke has a cross-sectional shape of letter I;
the permanent magnet has a cross-sectional shape of letter U consisting of a base portion and a pair of standing portions provided upright at the opposite ends of the base portion, and is attached to the base at a position spaced from the yoke and such that the pair of standing portions are directed toward the yoke;
the coil is attached to the mirror holder at a position between the yoke and the pair of standing portions of the permanent magnet such that the coil passes across a closed magnetic loop formed by the yoke and the base portion and the pair of standing portions of the permanent magnet; and
each of the plate springs extends through a gap between the pair of standing portions of the permanent magnet and is made of a nonmagnetic metal material.

8. The fast steering mirror as claimed in claim 5, wherein:
the yoke has a cross-sectional shape of letter I;
the permanent magnet also has a cross-sectional shape of letter I and is attached to the base at a position spaced from the yoke; and
the coil is attached to the mirror holder at a position between the permanent magnet and the yoke such that the coil passes across a closed magnetic loop formed by the permanent magnet and the yoke.

9. The fast steering mirror as claimed in claim 8, wherein the permanent magnet is composed of first and second permanent magnet portions which are arranged along the letter I so as to abut to each other with their magnetic poles oppositely oriented.

10. The fast steering mirror as claimed in claim 5, wherein:
the yoke has a cross-sectional shape of letter U consisting of a base portion and a pair of standing portions provided upright at the opposite ends of the base portion;
the permanent magnet is attached on the inner side surface of one of the pair of standing portions of the yoke;
the coil is attached to the mirror holder such that the coil surrounds the other one of the pair of standing portions of the yoke, and such that the coil passes across a closed magnetic loop formed by the permanent magnet and the base portion and the pair of standing portions of the yoke.

11. The fast steering mirror as claimed in claim 5, wherein:
the yoke is composed of a first and second yoke portions having a cross-sectional shape of letter I and attached to the base at positions spaced from each other;
the permanent magnet is composed of first and second permanent magnet portions attached to the first yoke portion such that the magnet portions are arranged with a gap therebetween along the letter I, and such that the magnet portions abut to each other with their magnetic poles oppositely oriented;
the coil is attached to the mirror at a position between the second yoke portion and the first and second permanent magnet portions attached to the first yoke portion, such that the coil passes across a formed by the first and second permanent magnet portions and the first and second yoke portions; and
each of the plate springs extends through a gap between the first and second permanent magnet portions and is made of a nonmagnetic metal material.

12. The fast steering mirror as claimed in claim 5, wherein the plate springs are used also as wiring for supplying drive current to the coil attached to the mirror holder.

13. The fast steering mirror as claimed in claim 6, wherein:
the yoke has a cross-sectional shape of letter I and is attached to the mirror holder;
the permanent magnet has a cross-sectional shape of letter I and is attached to the mirror holder via the yoke; and
the coil is attached to the base at a position between the permanent magnet and the yoke such that the coil passes across an extension line of an open magnetic circuit formed by the permanent magnet and the yoke.

14. The fast steering mirror as claimed in claim 13, wherein the permanent magnet is composed of first and second permanent magnet portions which are arranged along the letter I so as to abut to each other with their magnetic poles oppositely oriented.

15. The fast steering mirror as claimed in claim 1, wherein:
each of the m drive means is composed of a permanent magnet attached to the base and a coil attached to the mirror holder;
the permanent magnet has a cross-sectional shape of letter I; and
the coil is attached to the mirror holder so as to pass across an extension line of an open magnetic circuit formed by the permanent magnet.

16. The fast steering mirror as claimed in claim 1, wherein:
each of the m drive means is composed of a coil attached to the base and a permanent magnet attached to the mirror holder;
the permanent magnet has a cross-sectional shape of letter I; and
the coil is attached to the base so as to pass across an extension line of an open magnetic circuit formed by the permanent magnet.

17. An optical communication antenna having the fast steering mirror as claimed in claim 1.

18. An intersatellite optical communication system having the optical communication antenna as claimed in claim 17.

* * * * *